April 1, 1930.  E. ROBERTS  1,753,023
CENTRIFUGAL BASKET
Filed April 6, 1928
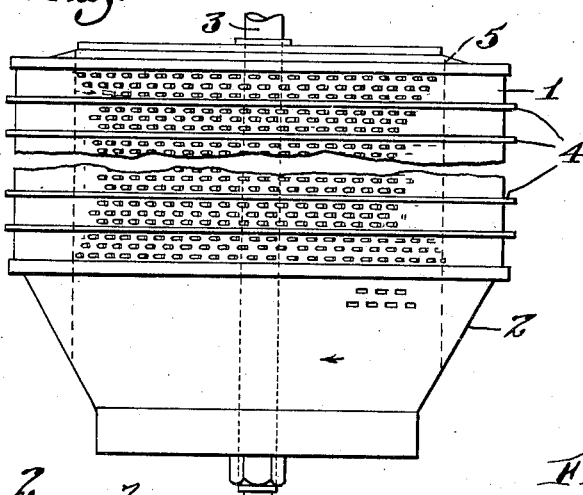
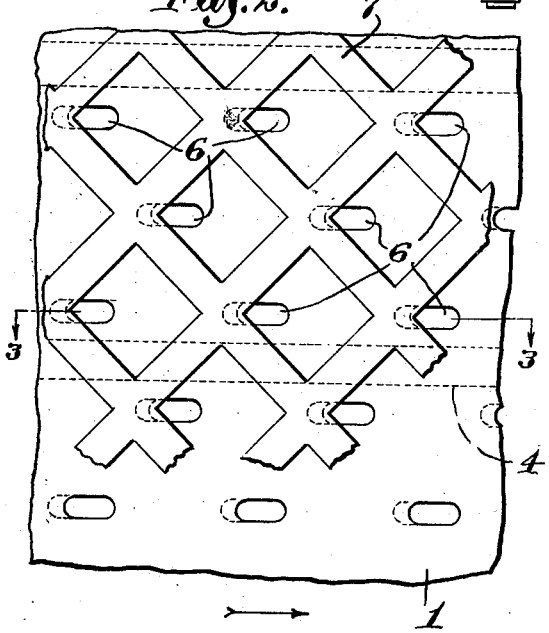
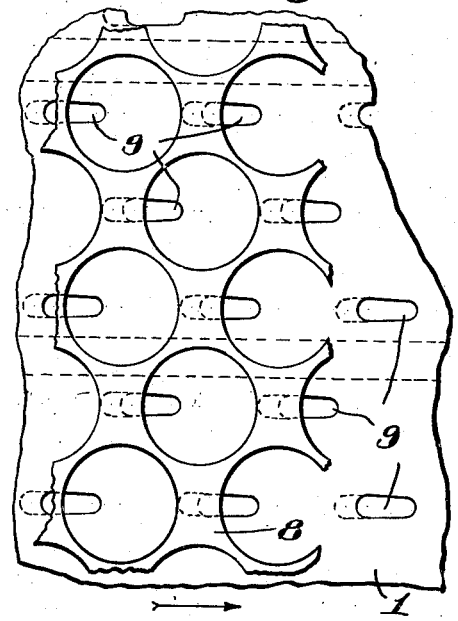
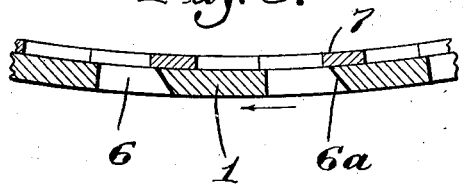
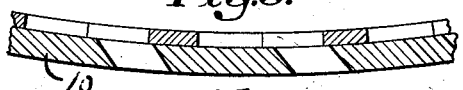
Inventor
Eugene Roberts
by Geo. N. Goddard,
Attorney Patented Apr. 1, 1930

1,753,023

UNITED STATES PATENT OFFICE

EUGENE ROBERTS, OF HASTINGS, NEW YORK, ASSIGNOR TO THE WESTERN STATES MACHINE COMPANY, OF SALT LAKE CITY, UTAH, A CORPORATION OF UTAH

CENTRIFUGAL BASKET

Application filed April 6, 1928. Serial No. 268,064.

This invention relates to centrifugal baskets such as are used for the separation of liquids from solids, as in the case of the manufacture of sugar, wherein the basket is provided with suitable interior filtering devices for retaining the solid particles while allowing the liquid or syrup to escape through openings in the peripheral wall of the centrifugal basket, such for example as is illustrated in United States Letters Patent granted to me April 13, 1926, No. 1,581,089.

According to the practice illustrated in the aforesaid patent, the basket wall is formed with numerous outlet perforations, usually countersunk on the inner wall of the basket to allow the escape of liquid, while the fine filtering elements are supported in slightly spaced relation to the basket by a skeleton grid whose openings surround the discharge holes in the basket.

I have found, however, that although these outlet holes are made a quarter inch or more in diameter, there is marked tendency for the holes to become clogged, while the grid pockets or recesses also tend to accumulate solid matter with consequent interference to the free discharge of the centrifugally extracted liquid. Study of this problem has convinced me that the cause of this clogging of the grid and of the pocket openings is due to the fact that the sticky syrup, which tends to shoot out from the basket at an angle of approximately 45 degrees to the radius of the basket at that point, and tends to build up against the inside rear edge of the aperture and the rear half of the grid pocket, owing partly to the adhesive and sticky nature of the liquid so that in time the discharge holes, as well as the grid pockets become largely filled by the accumulated deposit from the syrup.

The present invention deals with this problem by providing discharge apertures in the basket of an elongated slot form extending in the circumferential direction on the basket with the rear end-wall or edge of the slot, preferably cut away at an acute angle to afford no ledge for the lodgment of such material. In connection with such a slotted basket wall, I prefer to employ a spacing filter supporting grid of a character that will deflect the liquid therein, which has a relative rearward movement toward the slot so as to prevent accumulation of material inside the basket wall within the boundaries of the grid pockets.

This and other features of the invention will be particularly described in the following specification and will be defined in the claims hereto annexed.

In the accompanying drawings I have illustrated a construction and arrangement embodying the principles of this invention, in which Figure 1 shows a centrifugal basket in side elevation, portions being broken away to permit illustration on a sizable scale.

Figure 2 is a greatly enlarged view showing an elevation of the inside of such a perforated basket with a filter supporting grid arranged to efficiently co-act therewith.

Figure 3 is a horizontal section through a portion of the basket periphery taken on a line through the middle of a circumferential row of slots and intersecting front and rear diagonal corners of the grid.

Figure 4 is a view similar to Figure 2 showing a modified form of grid applied to a slotted outlet basket.

Fig. 5 is a detail cross sectional view of the basket wall showing a modified form of basket slot or perforation.

In the practice of the invention, as illustrated in the drawings, I employ any well known form of sugar basket, which in this case comprises a cylindrical portion 1 having a frusto-conical bottom 2 fitting around and secured to a radial spoke open spider which secures it to the basket shaft 3 in accordance with usual and well known practice. The basket also has a top or cap-ring for preventing the escape of liquid over the top. A series of re-inforcing bands or rings 4 serve to strengthen the basket to resist the heavy pressure of the load under centrifugal force. The interior filter elements are not shown herein and may be of any suitable type such as that illustrated in my aforesaid Letters Patent.

The peripheral wall of the basket is provided with parallel rows of slots whose longitudinal axes extend in a circumferential direction, the slots of one row being preferably staggered in relation to the slots of the adjacent rows. These slots 6 are so spaced with reference to the dimensions of the grid to be inserted for supporting the filtering elements, that they occupy the rearward portion of the basket areas that subtend the large openings in the grid. Furthermore, as shown at 6a, the rearward end edges of these slots are cut away at an acute angle so that as the basket and grid revolve in a clock-wise direction, the thin bevelled edge of each slot tends to have something of a shearing or scoop-like effect, as the bevelled face extends approximately in the direction that the centrifugally expelled liquid takes when issuing from the basket.

By extending the elongated slots through the rearward portion of the pocket formed by the grid, the rear end or edge portion of the slot presents no collecting ledge for obstructing the outflow of the liquid and, therefore, avoids accumulation of material at this point. At the same time it acts, by its relation to the rear end boundary of the grid recess, to prevent accumulation of material in the rear portion of the grid pocket. Since the liquid in the forward portion of each grid pocket tends to creep or lag rearwardly in relation to the circumferential rotation of the pocket, both the pocket and the discharge aperture are kept clear, so that at all times the liquid can escape free without obstruction.

Another feature of improvement consists in arranging the grid in such relation to the discharge slots that the rearward creep or drift of the liquid results in its being deflected by the grid directly toward the discharge opening.

The grid 7 illustrated in the drawings is of the same construction as the grid shown in my former patent, but it is arranged in oblique relationship to the basket so that there are two converging boundary edges of each pocket obliquely inclined to the direction of rotation and thereby tending to guide the rearwardly creeping liquid therein into the discharge slot which drains that pocket.

In Figure 4 I have illustrated a modified form of grid, as shown at 8, in which the recesses or pockets are of circular form, the slots of course subtending the rearward portions of said circular openings, for the reasons previously described. In this case, in order that the slots 9 may subtend a larger arc at the rear of the circular recesses, the slots are made narrow at their forward ends and wider at their rear ends, in order to have them extend to points on the circle where there is a substantial deflection upon the liquid toward the slot.

With the above described principal of construction and arrangement, it will be found that there is no substantial tendency for the pockets or the outlet holes in the basket to become clogged. Hence, the filtering process is carried on without loss of efficiency, due to such gradual obstruction of the outlet passages.

The elongated slots may be formed by punching out the apertures in the sheet metal which forms the basket wall, while the rearward bevelling of the rear ends of the slots may be conveniently performed by means of a broach. While I prefer to bevel the rear ends of the slots, as above described, so as to leave no slot ledge or wall affording lodgment for the material being treated, nevertheless, even if the rear end wall of the slots extends in a radial direction it will still be seen that, owing to the elongation of the opening, only a small rearward portion of the slot will become obstructed even in that case, since the major part of the slot will necessarily remain clear. With the bevelled slot, however, practically no accumulation of material in the slot will occur.

Instead of broaching out the slot, as indicated in Figure 3 to give an outwardly flared bevel, I may drill through punched slots at an acute angle to the face of the basket sheet, in which case both the forward and the rear ends of the basket slots will have substantially parallel inclinations in a direction to prevent lodgment of material thereon, as illustrated in the basket plate 10 of Figure 5.

What I claim is:

1. A centrifugal basket whose peripheral wall is provided with elongated openings extending in the circumferential direction of the basket, the rear walls of said slots having their inner edges forwardly offset in relation to the outer edges thereof whereby accumulation of the sticky content of the liquid against said wall is prevented.

2. A centrifugal basket whose peripheral wall is provided with rows of relatively narrow, elongated spaced, slots extending in the circumferential direction of the basket, the rear ends of such slots, rotatively considered, being bevelled to a thin edge at the inside face of the basket to facilitate the expulsion of the liquid from the basket.

3. A centrifugal basket having a peripheral wall provided with relatively narrow, elongated slots extending in the direction of rotation of the basket, and an interior openwork filter-supporting grid arranged against the inside face of the peripheral wall so that the slots intersect the rearmost portions of the area subtending the open space in the grid, each opening in the grid having side walls inclined to direct liquid to its rearmost portion.

In witness whereof, I have subscribed the above specification.

EUGENE ROBERTS.